UNITED STATES PATENT OFFICE.

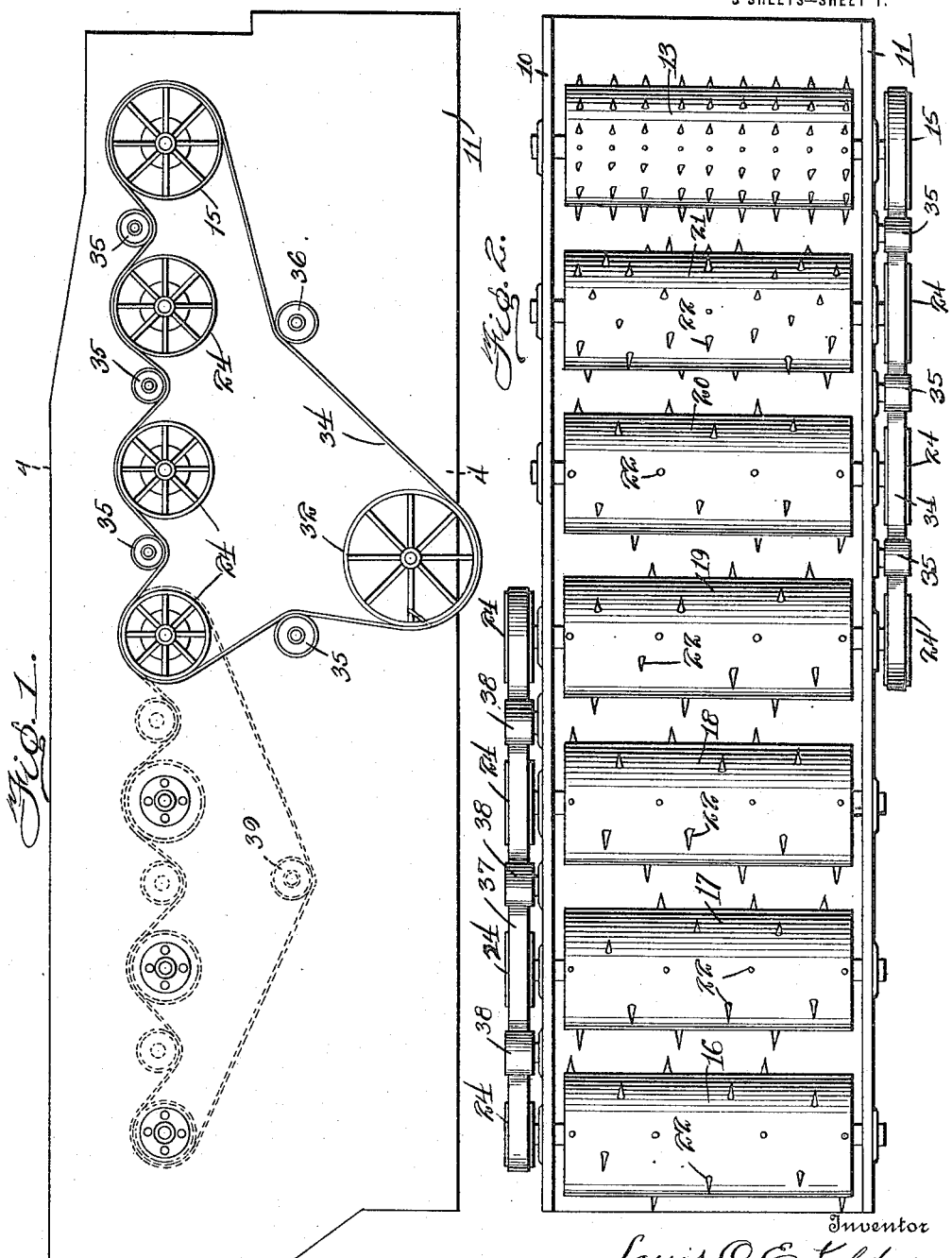

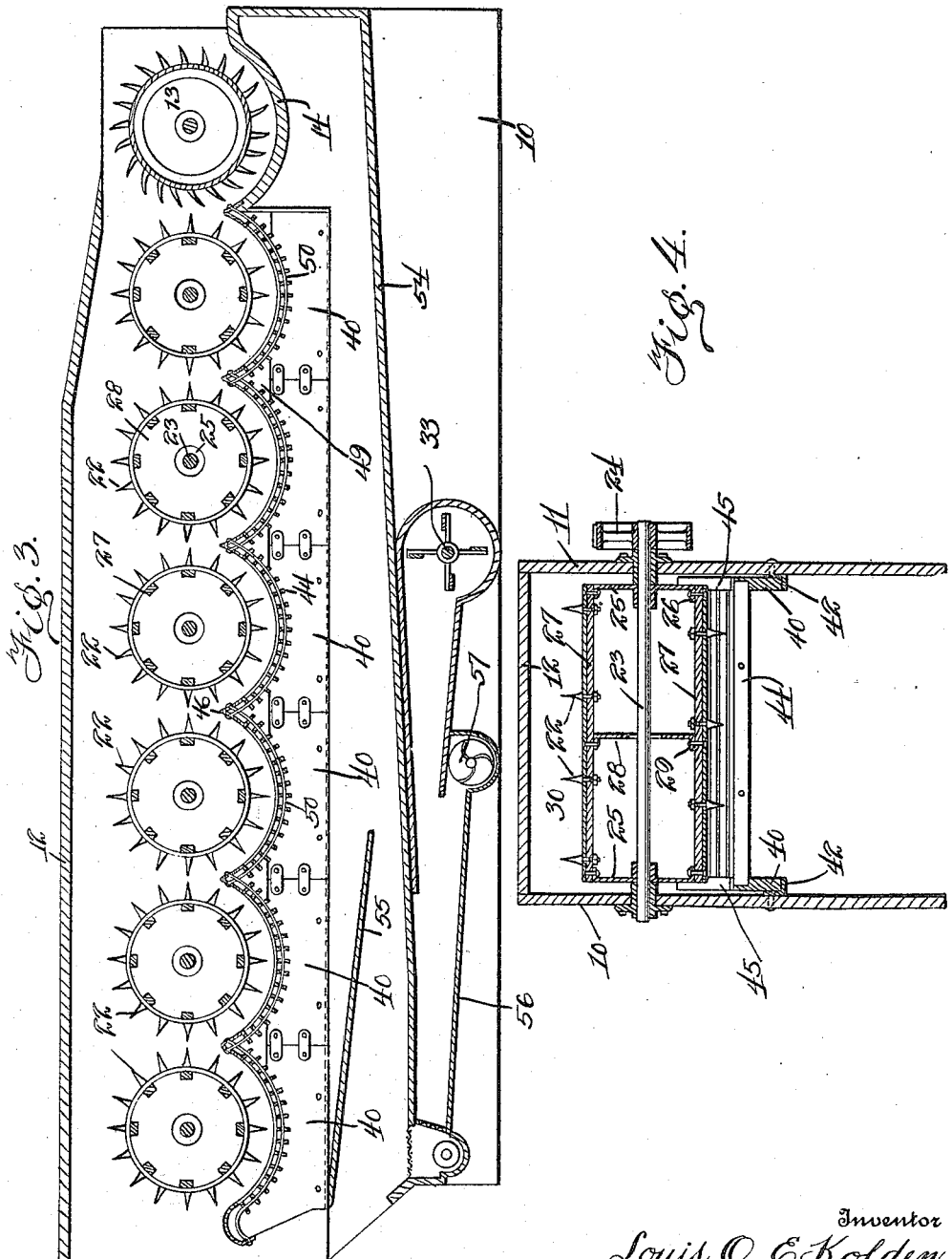

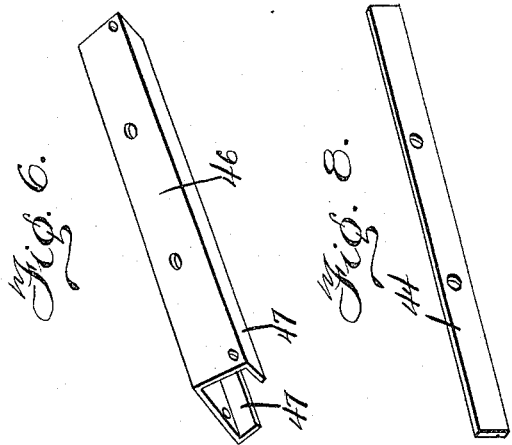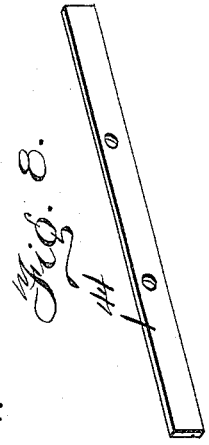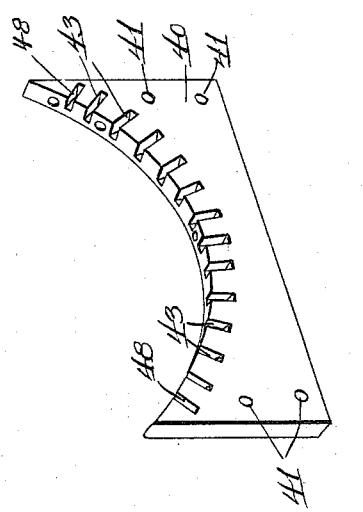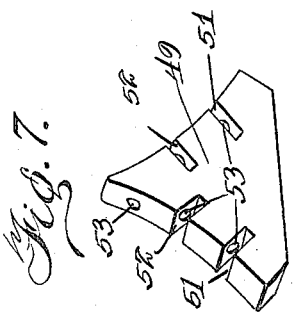

LOUIS OLOF E. KOLDEN, OF ODIN, MINNESOTA.

THRESHING-MACHINE.

1,165,786.  Specification of Letters Patent.  Patented Dec. 28, 1915.

Application filed June 4, 1914. Serial No. 843,049.

*To all whom it may concern:*

Be it known that I, LOUIS OLOF E. KOLDEN, a citizen of the United States, residing at Odin, in the county of Watonwan and State of Minnesota, have invented certain new and useful Improvements in Threshing-Machines, of which the following is a specification.

This invention relates to a threshing machine and the principal object of the invention is to provide the threshing machine with an improved arrangement of beaters and grates, the beaters being so arranged that they will spread the straw after passing beneath the threshing cylinder and thoroughly separate it, thus permitting the loose grain to be shaken out of the straw.

Another object of the invention is to provide improved means for operating the threshing cylinder and beaters.

Another object of the invention is to provide improved means for constructing the grates, the grates being so constructed that they will be very rigid and securely held in the set up position.

Another object of the invention is to so construct the grates that they may be easily set up.

This invention is illustrated in the accompanying drawings, wherein—

Figure 1 is a view showing the body portion of the threshing machine in side elevation; Fig. 2 is a top plan view of the threshing machine with the cover removed; Fig. 3 is a vertical longitudinal sectional view through the threshing machine; Fig. 4 is a transverse vertical sectional view through the threshing machine; Fig. 5 is a perspective view of one of the side plates used in forming the grates; Fig. 6 is a perspective view of one of the ridge caps forming part of the grates; Fig. 7 is a perspective view of one of the blocks placed intermediate the width of each of the ridge caps; Fig. 8 is a perspective view of one of the grate bars; and Fig. 9 is a perspective view of one of the teeth carried by the beaters.

This threshing machine is provided with the side walls 10 and 11 which support the cover 12. The threshing cylinder 13 is rotatably mounted above the threshing board 14 and is provided with a pulley wheel 15 so that the threshing cylinder may be rotated. The beaters 16, 17, 18, 19, 20 and 21 are rotatably mounted transversely in the threshing machine and are provided with teeth 22 which are arranged as shown in Fig. 2. The teeth of the beater 21 engage the straw after it has passed beneath the threshing cylinder and spread it so that most of the grain passes through the grate positioned beneath the cylinder 21. The grain is then engaged by the teeth of the remaining beaters and successively moved diagonally across the grates positioned beneath the beaters, due to the action of the teeth which are placed in spirally extending rows around the beaters, thus moving the straw from one side of the threshing machine to the other and separating the straw so that the grain which may remain in the straw after passing beneath the beater 21 will be shaken loose.

Each of these beaters comprises a shaft 23 which carries a pulley wheel 24. The shaft of beater 19 carries a pulley wheel 24 upon each end as shown in Fig. 2 so that rotary motion can be transmitted from the shaft of beater 19 to the pulley wheels which are mounted upon the opposite sides of the threshing machine from those shown in full lines in Fig. 1. This arrangement is very clearly shown in Fig. 2. The heads 25 of each beater are mounted upon the shaft 23 and have their edge portions cut to provide tongues 26 which are bent inwardly as shown in Fig. 4 so that the bars 27 may be secured to the tongues 26 with their end portions extending into the slots formed by the tongues. A center disk 28 is placed intermediate the width of the roller and is also provided with tongues 29 to which the bars are secured. A casing 30 which is preferably formed of sheet metal is placed about the frame of the beater and is provided with openings through which the shanks 31 of the teeth 22 may pass so that the shanks of the teeth may pass through the bars 27 as clearly shown in Fig. 4.

The pulley 32 which is mounted upon the shaft of fan 33 moves the belt 34 which passes around the pulleys 15 and 24 upon one side of the machine and also passes around the guiding pulleys 35. A belt tightener 36 is provided to hold the belt 34 in tight engagement with the pulley wheels and cause the threshing cylinder and beaters 19, 20 and 21 to be rotated. Upon the opposite side of the machine there is provided a second belt 37 which passes around the pulley wheels 24 beneath the guiding wheels 38, a belt tightener 39 being provided so that the beaters 16, 17 and 18 may be rotated.

The grates are provided with side plates or castings 40 which are secured to the side walls 10 and 11 by means of bolts passing through openings 41. The side plates are also supported by means of strips 42 extending beneath the lower edges of the plates as shown in Fig. 4. The upper edges of the plates are arcuate and are provided with notches 43 forming seats to receive the ends of the grate bars 44. After these grate bars 44 have been put in place securing strips 45 are secured to the upper edges of the plates 40 to securely hold the grate bars in the seats 43. In Fig. 6, there is shown one of the ridged caps which are formed of sheet metal and have their edge portions bent to form fingers or flanges 47 which extend into the end notches 48 as shown in Fig. 3 and thus securely hold the ridged caps in place. It is necessary that the ridged caps and grate bars be braced and therefore there has been provided the bracing blocks 49 and bracing rods 50. The bracing blocks 49 are positioned at a point intermediate the width of the ridged caps 46 and are provided with slots 51 and 52 through which the grate bars and flanges 47 pass. They are also provided with openings 53 through which the bracing rods 50 pass.

When this machine is in use, the bundles of grain are fed into the machine beneath the threshing cylinder and the grain is threshed out of the heads and most of it falls to the pan 54 extending beneath the grates as the straw passes beneath the spreading beater 21. This spreading beater separates the straw into a comparatively thin sheet extending approximately the full width of the first grate. After the straw has passed beneath the first beater it successively passes beneath the remaining beaters which shift it from one side to the other and thus thoroughly shake the straw so that any grain which may have become caught in the straw will be shaken out and dropped through the grates onto the pan 54 or pan 55. The grain will then pass on to the chute 50 56 leading to the screw conveyer 57 which feeds the grain out of the threshing machine. As the grain passes along the chute 56 it will be struck by a blast from the fan 33 and all dust and chaff removed from the grain

What is claimed is:—

1. A threshing machine comprising a body portion, grain removing means coöperating with said body portion, beating means leading from said grain removing means, said beating means comprising a plurality of side plates having arcuate upper edges provided with cut outs forming seats, grate bars having their end portions fitting within said seats, securing strips connected with the upper edges of said side plates to removably hold said grate bars in said seats, ridged caps having their end portions connected with said side plates, reinforcing blocks positioned intermediate the length of each of said ridged caps, rods extending through said grate bars and having their end portions extending through said bracing blocks and ridged caps, and beating cylinders rotating above said grates.

2. In a threshing machine, a beating mechanism comprising side supports having their upper edges provided with seats, grate bars having their end portions fitting within said seats, means for releasably holding said grate bars within said seats, ridged caps provided with side flanges passing through cut outs formed in said side supports, bracing blocks for said ridged caps provided with cut outs to receive said flanges and certain of said grate bars, bracing rods passing through said grate bars and having their end portions passing through said bracing blocks and ridged caps, and cylinders rotating above said grate bars.

In testimony whereof I affix my signature in presence of two witnesses.

LOUIS OLOF E. KOLDEN.

Witnesses:
 JACOB TEIGEN,
 JOHN HAGEN.

Copies of this patent may be obtained for five cents each, by addressing the "Commissioner of Patents, Washington, D. C."